United States Patent Office 3,087,955
Patented Apr. 30, 1963

3,087,955
O-HALOALKYL O-ALKYL PHOSPHORAMIDO-
THIOATES
Harry F. Brust, Midland, Mich., assignor to The Dow
Chemical Company, Midland, Mich., a corporation of
Delaware
No Drawing. Filed Feb. 8, 1960, Ser. No. 7,101
6 Claims. (Cl. 260—461)

The present invention is directed to the O-haloalkyl O-alkyl phosphoramidothioates corresponding to the formulae

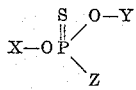

In this and succeeding formulae, X represents halo-lower-alkyl, Y represents alkyl and Z represents amino or alkyl-amino. In the present specification and claims, the expression "alkyl" is employed to refer to the alkyl radicals containing from 1–12 carbon atoms, inclusive, and the expression "lower-alkyl" to refer to the alkyl radicals containing from 1–4 carbon atoms, inclusive. These new compounds are liquid materials which are somewhat soluble in many common organic solvents and of low solubility in water. They are useful as herbicides and parasiticides and are adapted to be employed as active toxic constituents of compositions for the control of common weeds and grasses, mites, insects, Helminths, ascarids, bacteria and fungus such as flies, aphids, beetles, southern army worms, pinworms and *Alternaria solani*.

The new compounds may be prepared by several methods. A preferred procedure comprises reacting an alkali metal salt of an alkanol (YOH) with an O-halo-lower-alkyl phosphoramidochloridothioate having the formula

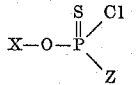

The reaction preferably is carried out in an inert organic liquid as reaction medium and conveniently in the alcohol from which the alcoholate is prepared. Good results are obtained when employing substantially equimolecular proportions of the reagents. The reaction is somewhat exothermic and takes place smoothly at temperatures of from −10° to 65° C. with the production of the desired product and alkali metal chloride of reaction. The temperature may be controlled by regulating the rate of contacting the reactants and by external cooling. In carrying out the reaction, the reactants may be mixed together in any convenient fashion and maintained for a period of time at a temperature of from −10° to 65° C. When the reaction is complete, the reaction mixture may be filtered to separate alkali metal chloride of reaction and the reaction medium removed by evaporation or fractional distillation under reduced pressure to obtain the desired product as a residue. In an alternative method of separation, the reaction medium is removed by evaporation or distillation under reduced pressure and the residue dispersed in a water immiscible solvent such as benzene or methylene chloride. The solvent mixture is then washed with water and the solvent thereafter removed by evaporation or distillation under reduced pressure to obtain the desired product as a residue. The product may be further purified by conventional procedures.

In an alternative method, the new compounds may be prepared by reacting an alkali metal salt of a halo-lower-alkanol (XOH) with a phosphoramidochloridothioate having the formula

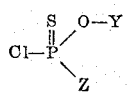

The conditions of reaction and methods of separation are all as previously described.

The following examples merely illustrate the invention and are not to be construed as limiting:

EXAMPLE 1

*O-(2-Chloroethyl) O-Methyl N-Methyl Phosphoramidothioate*

Sodium (3.53 grams; 0.153 mole) was dissolved in 100 milliliters of methanol to prepare a solution of sodium methylate. This solution was added portionwise with stirring to 33.3 grams (0.153 mole) of O-(2-chloroethyl) N-methyl phosphoramidochloridothioate ($n/D$ of 1.5241 at 25° C.) dispersed in 100 milliliters of methanol. The addition was carried out over a period of 1.5 hours and at a temperature of about 5° C. The reaction mixture was then warmed to room temperature and stirring continued for 15 hours to complete the reaction. The mixture was thereafter filtered to separate sodium chloride, and the methanol removed from the filtrate by distillation under reduced pressure to obtain an O-(2-chloroethyl) O-methyl N-methyl phosphoramidothioate product as a liquid residue. This product had a refractive index $n/D$ of 1.5012 at 25° C. and a chlorine content of 17.13 percent as compared to a theoretical content of 17.4 percent.

EXAMPLE 2

*O-(2,2,2-Tribromoethyl) O-Isopropyl N-Methyl Phosphoramidothioate*

Sodium (1.2 grams; 0.05 mole) was dissolved in 230 milliliters of isopropanol to prepare a solution of the sodium salt of isopropanol. This solution was added portionwise with stirring to 20.5 grams (0.05 mole) of O-(2,2,2-tribromoethyl) N-methyl phosphoramidochloridothioate ($n/D$ of 1.6115 at 25° C.) dispsered in 150 milliliters of isopropanol. The addition was carried out over a period of 1.5 hours and at a temperature of from 10° to 15° C. The reaction mixture was then warmed to room temperature and stirring continued for two hours to complete the reaction. The mixture was thereafter filtered to remove sodium chloride and the solvent removed from the filtrate by fractional distillation under reduced pressure. As a result of these operations, there was obtained an O-(2,2,2-tribromoethyl) O-isopropyl N-methyl phosphoramidothioate product as a liquid residue having a refractive index $n/D$ of 1.5645 at 25° C. and bromine and phosphorous contents of 56.1 percent and 7.1 percent, respectively, as compared to theoretical contents of 54.5 percent and 7.06 percent.

EXAMPLE 3

*O-(2,2,2-Trifluoroethyl) O-Methyl N-Methyl Phosphoramidothioate*

2,2,2-trifluoroethanol (10 grams; 0.1 mole) was added portionwise over a period of 0.25 hour with stirring to 23 grams (0.5 mole) of sodium dispersed in 300 milliliters of benzene to produce a benzene dispersion of the sodium salt of trifluoroethanol. To this dispersion was added portionwise 79 grams (0.495 mole) of O-methyl N-methyl phosphoramidochloridothioate dispersed in 565 milliliters of benzene. The addition was carried out over a period of one hour with stirring and at a temperature of from 20° to 25° C. To complete the reaction, stirring was then continued for 16 hours at room temperature. The reaction mixture was then filtered and the filtrate fractionally distilled under reduced pressure to separate an O-(2,2,2-trifluoroethyl) O-methyl N-methyl phosphoramidothioate product as a liquid material having a refractive index $n/D$ of 1.4337 at 25° C. and phosphorous and sulfur contents of 13.9 percent and 14.5 percent, respectively, as compared to theoretical contents of 13.89 percent and 14.35 percent.

In a similar manner, other O-halo-loweralkyl O-alkyl phosphoramidothioates of the present invention may be prepared as follows:

O-(3-chloropropyl) O-methyl N-methyl phosphoramidothioate (specific gravity of 1.241 at 25°/25° C.; $n/D$ of 1.4995 at 25° C.) by reacting together sodium methylate and O-(3-chloropropyl) N-methyl phosphoramidochloridothioate ($n/D$ of 1.5241 at 25° C.).

O-(2-fluoroethyl) O-methyl N-methyl phosphoramidothioate (having a molecular weight of 187) by reacting together sodium methylate and O-(2-fluoroethyl) N-methyl phosphoramidochloridothioate.

O-(2-bromoethyl) O-methyl N-methyl phosphoramidothioate ($n/D$ of 1.5438 at 25° C.) by reacting together potassium methylate and O-(2-bromoethyl) N-methyl phosphoramidochloridothioate ($n/D$ 1.5571 at 25° C.).

O-(1-methyl-2-chloroethyl) O-methyl N-methyl phosphoramidothioate (specific gravity of 1.242 at 25°/25° C.; $n/D$ of 1.4914 at 25° C.) by reacting together sodium methylate and O-(1-methyl-2-chloroethyl) N-methyl phosphoramidochloridothioate ($n/D$ of 1.5185 at 25° C.).

O-(2,2-dichloropropyl) O-methyl N-methyl phosphoramidothioate (specific gravity 1.320 at 25°/25° C.; $n/D$ of 1.5050 at 25° C.) by reacting together sodium methylate and O-(2,2-dichloropropyl) N-methyl phosphoramidochloridothioate (molecular weight of 256).

O-(2-bromoethyl) O-isopropyl N-methyl phosphoramidothioate ($n/D$ of 1.5146 at 25° C.) by reacting together the sodium salt of isopropanol and O-(2-bromoethyl) N-methyl phosphoramidochloridothioate.

O-(2,2,2-trichloroethyl) O-methyl N-methyl phosphoramidothioate (specific gravity 1.446 at 25°/25° C.; $n/D$ of 1.5129 at 25° C.) by reacting together the sodium methylate and O-(2,2,2,-trichloroethyl) N-methyl phosphoramidochloridothioate ($n/D$ of 1.5380 at 25° C.).

O-(2,2,2,-trichloroethyl) O-butyl N-methyl phosphoramidothioate ($n/D$ of 1.4946 at 25° C.) by reacting together sodium butylate and O-(2,2,2-trichloroethyl) N-methyl phosphoramidochloridothioate.

O-(1-methyl-2,2,2-trifluoroethyl) O-methyl N-methyl phosphoramidothioate ($n/D$ of 1.4780 at 25° C.) by reacting together the sodium salt of 1-methyl-2,2,2-trifluoroethanol and O-methyl N-methyl phosphoramidochloridothioate ($n/D$ of 1.5156 at 25° C.).

O-(3-chloropropyl) O-butyl N-methyl phosphoramidothioate ($n/D$ of 1.4876 at 25° C.) by reacting together sodium butylate and O-(3-chloropropyl) N-methyl phosphoramidochloridothioate ($n/D$ of 1.4991 at 25° C.).

O-(2-bromoethyl) O-methyl N,N-dimethyl phosphoramidothioate ($n/D$ of 1.5148 at 25° C.) by reacting together sodium methylate and O-(2-bromoethyl) N,N-dimethyl phosphoramidochloridothioate ($n/D$ 1.5374 at 25° C.).

O-(2,4,4,4-tetrachlorobutyl) O-methyl N-methyl phosphoramidothioate ($n/D$ of 1.5236 at 25° C.) by reacting together sodium methylate and O-(2,4,4,4-tetrachlorobutyl) N-methyl phosphoramidochloridothioate ($n/D$ of 1.5395 at 25° C.).

O-(2-bromo-4,4,4-trichlorobutyl) O-methyl N-methyl phosphoramidothioate ($n/D$ of 1.5391 at 25° C.) by reacting together sodium methylate and O-(2-bromo-4,4,4-trichlorobutyl) N-methyl phosphoramidochloridothioate ($n/D$ of 1.5578 at 25° C.).

O-(2-bromoethyl) O-isopropyl N,N-dimethyl phosphoramidothioate ($n/D$ of 1.5225 at 25° C.) by reacting together the sodium salt of isopropanol and O-(2-bromoethyl) N,N-dimethyl phosphoramidochloridothioate.

O-(2-bromo-4,4,4-trichlorobutyl) O-ethyl N-methyl phosphoramidothioate ($n/D$ of 1.5320 at 25° C.) by reacting together sodium ethylate and O-(2-bromo-4,4,4-trichlorobutyl N-methyl phosphoramidochloridothioate ($n/D$ of 1.5578 at 25° C.).

O-(3-chloropropyl) O-isopropyl N-butyl phosphoramidothioate ($n/D$ of 1.4816 at 25° C.) by reacting together the sodium salt of isopropyl and O-(3-chloropropyl) N-butyl phosphoramidochloridothioate ($n/D$ of 1.5083 at 25° C.).

O-(3-chloropropyl) O-methyl N-butyl phosphoramidothioate ($n/D$ of 1.4891 at 25° C.) by reacting together sodium methylate and O-(3-chloropropyl) N-butyl phosphoramidochloridothioate.

O-(3-chloropropyl) O-methyl N-octyl phosphoramidothioate ($n/D$ of 1.4836 at 25° C.) by reacting together sodium methylate and O-(3-chloropropyl) N-octyl phosphoramidochloridothioate (molecular weight of 320).

O-(3-chloropropyl) O-(2-methylheptyl) N-dodecyl phosphoramidothioate ($n/D$ of 1.4787 at 25° C.) by reacting together the sodium salt of 2-methylheptyl alcohol and O-(3-chloropropyl) N-dodecyl phosphoramidochloridothioate (molecular weight of 321).

O-(1-methyl-2-bromoethyl) O-methyl N-methyl phosphoramidothioate ($n/D$ of 1.5185 at 25° C.) by reacting together sodium methylate and O-(1-methyl-2-bromoethyl) N-methyl phosphoramidochloridothioate ($n/D$ 1.5423 at 25° C.).

O-(1-methyl-2-bromoethyl) O-isopropyl N-methyl phosphoramidothioate ($n/D$ of 1.4952 at 25° C.) by reacting together the sodium salt of isopropanol and O-(1-methyl-2-bromoethyl) N-methyl phosphoramidochloridothioate ($n/D$ 1.5423 at 25° C.).

O-(1-methyl-2-bromoethyl) O-methyl N,N-dimethyl phosphoramidothioate ($n/D$ of 1.5010 at 25° C.) by reacting together sodium methylate and O-(1-methyl-2-bromoethyl) N,N-dimethyl phosphoramidochloridothioate ($n/D$ 1.5270 at 25° C.).

O-(1-methyl-2,2,2-trifluoroethyl) O-ethyl N-methyl phosphoramidothioate ($n/D$ of 1.4724 at 25° C.) by reacting together the sodium salt of 1-methyl-2,2,2-trifluoroethanol and O-ethyl N-methyl phosphoramidochloridothioate ($n/D$ 1.5060 at 25° C.).

O-(1-methyl-2-bromoethyl) O-isopropyl N,N-dimethyl phosphoramidothioate ($n/D$ of 1.5189 at 25° C.) by reacting together the sodium salt of isopropanol and O-(1-methyl-2-bromoethyl) N,N-dimethyl phosphoramidochloridothioate.

O-(1-methyl-2-bromoethyl) O-methyl N-isopropyl phosphoramidothioate ($n/D$ of 1.5079 at 25° C.) by reacting together sodium methylate and O-(1-methyl-2-bromoethyl) N-isopropyl phosphoramidochloridothioate ($n/D$ 1.5230 at 25° C.).

O-(3-chloropropyl) O-butyl N-octyl phosphoramidothioate ($n/D$ of 1.4801 at 25° C.) by reacting together sodium butylate and O-(3-chloropropyl) N-octyl phosphoramidochloridothioate (molecular weight 320).

O-(3-chloropropyl) O-(2-methylheptyl) N-octyl phosphoramidothioate ($n/D$ of 1.4785 at 25° C.) by reacting together the sodium salt of 2-methylheptyl alcohol and O-(3-chloropropyl) n-octyl phosphoramidochloridothioate.

O-(2-chloroethyl) O-dodecyl N-methyl phosphoramidothioate by reacting together the potassium salt of dodecyl alcohol and O-(2-chloroethyl) N-methyl phosphoramidothioate.

The new compounds of the present invention are effective as herbicides and parasiticides. For such use, the products may be dispersed on an inert finely divided solid and employed as dusts. Also, such mixtures may be dispersed in water with the aid of a surface active agent, and the resulting aqueous suspensions employed as sprays. In other procedures, the products may be employed as toxic constituents of oil-in-water or water-in-oil emulsions, or water dispersions with or without the addition of surface active dispersing agents. In representative operations, the drenching of seed beds with aqueous compositions containing 100 parts by weight of O-(2-bromo-4,4,4-trichlorobutyl) O-methyl N-methyl phosphoramidothioate per million parts of ultimate mixture gives 100 percent control of the growth of the germinant seeds and emerging seedlings of German millet. In other operations, aqueous compositions containing two parts by weight of O-(1-methyl-2-bromoethyl) O-methyl N,N-dimethyl phosphoramidothioate per million parts of ultimate mixture give 100 percent kills of bean aphids.

The O-(halo-loweralkyl) phosphoramidochloridothioates and O-alkyl phosphoramidochloridothioates employed as starting materials in accordance with the teachings of the present application may be prepared by reacting about two molecular proportions of ammonia or an alkyl amine with about one molecular proportion of an O-(halo-loweralkyl) or O-alkyl-phosphordichloridothioate at a temperature of from −10° to 50° C. The reaction is somewhat exothermic and takes place smoothly in the described temperature range with the production of the desired product and ammonia or amine hydrochloride of reaction. Upon completion of the reaction, the desired phosphoramidochloridothioate is separated by conventional methods. The O-(halo-loweralkyl) and O-alkyl phosphordichloridothioates may be prepared by reacting an excess of phosphorous thiochloride with a suitable alcohol (XOH or YOH) in the presence of a tertiary amine as hydrogen chloride acceptor. Good results are obtained when operating at temperatures at from −10° to 80° C. and employing from 1–5 moles of $PSCl_3$ with one mole each of tertiary amine and alcohol. Upon completion of the reaction, the desired phosphorodichloridothioate may be separated by known methods.

I claim:
1. The O-halo-loweralkyl O-alkyl phosphoramidothioates corresponding to the formula

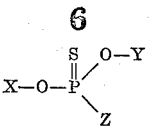

wherein X represents halo-loweralkyl, Y represents alkyl, and Z represents a member of the group consisting of amino and alkyl amino.

2. O-(2-bromo-4,4,4-trichlorobutyl) O-methyl N-methyl phosphoramidothioate.
3. O-(2-bromoethyl) O-methyl N,N-dimethyl phosphoramidothioate.
4. O-(2-bromoethyl) O-isopropyl N,N-dimethyl phosphoramidothioate.
5. O-(3-chloropropyl) O-isopropyl N-butyl phosphoramidothioate.
6. O-(2-chloroethyl) O-methyl N-methyl phosphoramidothioate.

References Cited in the file of this patent
UNITED STATES PATENTS

| | | |
|---|---|---|
| 2,610,978 | Lanham | Sept. 16, 1952 |
| 2,712,029 | Van Winkle et al. | June 28, 1955 |
| 2,828,228 | Glade et al. | Mar. 25, 1958 |
| 2,832,745 | Hechenbleikner | Apr. 29, 1958 |
| 2,852,550 | Godfrey | Sept. 16, 1958 |
| 2,894,019 | Maeder | July 7, 1959 |
| 2,909,556 | Heininger | Oct. 20, 1959 |
| 2,967,884 | Dunn et al. | Jan. 10, 1961 |

OTHER REFERENCES

Kabachink et al.: Journal of General Chemistry, U.S.S.R., 29, 1680–1683 (1959).